(No Model.) 2 Sheets—Sheet 1.

J. W. HOLMAN.
BUTTON SEPARATOR.

No. 527,394. Patented Oct. 9, 1894.

WITNESSES
E. K. Roemer
H. R. Wheeler

INVENTOR
Joseph W. Holman
By R. B. Wheeler & Co.
Attorneys.

(No Model.) 2 Sheets—Sheet 2.

J. W. HOLMAN.
BUTTON SEPARATOR.

No. 527,394. Patented Oct. 9, 1894.

WITNESSES
E. K. Roemer
H. R. Wheeler

INVENTOR
Joseph W. Holman
By R. B. Wheeler & Co.
Attorneys.

UNITED STATES PATENT OFFICE.

JOSEPH W. HOLMAN, OF DETROIT, MICHIGAN, ASSIGNOR OF ONE-THIRD TO ORRIN J. PRICE, OF SAME PLACE.

BUTTON-SEPARATOR.

SPECIFICATION forming part of Letters Patent No. 527,394, dated October 9, 1894.

Application filed April 17, 1893. Serial No. 470,596. (No model.)

*To all whom it may concern:*

Be it known that I, JOSEPH W. HOLMAN, a citizen of the United States, residing at Detroit, in the county of Wayne, State of Michigan, have invented certain new and useful Improvements in Button-Separators; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to a device for separating the buttons from the scraps in pearl button cutting, and consists in means in connection with the cutting mechanism for effecting this separation automatically and simultaneously with the cutting of the button, all of which will be hereinafter more fully set forth, and the essential features pointed out particularly in the claims.

The object of the invention is to provide for separating the buttons from the scraps, mechanically, at the time of cutting, thereby obviating the great amount of labor and time incident to effecting this separation by hand, as commonly practiced. This object is attained by the mechanism illustrated in the accompanying drawings, in which—

Figure 1:
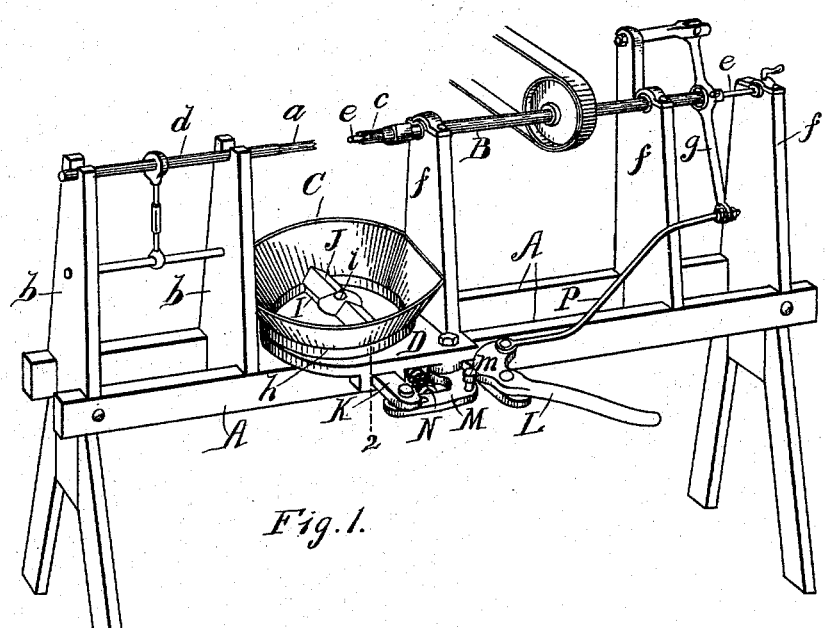
Figure 2:
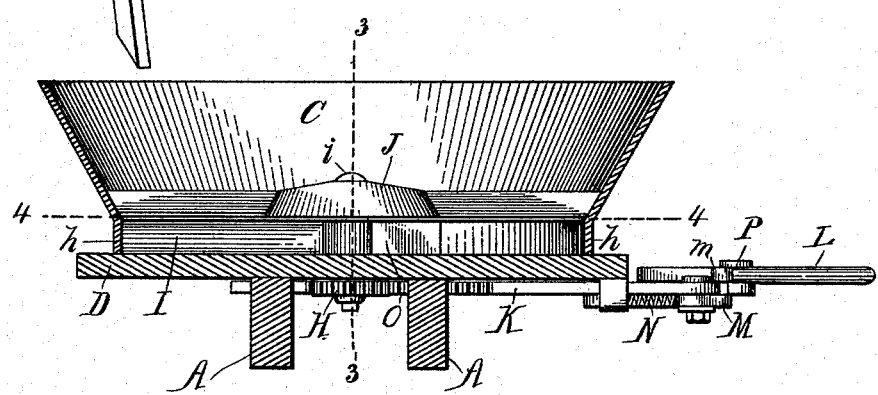
Figure 3:
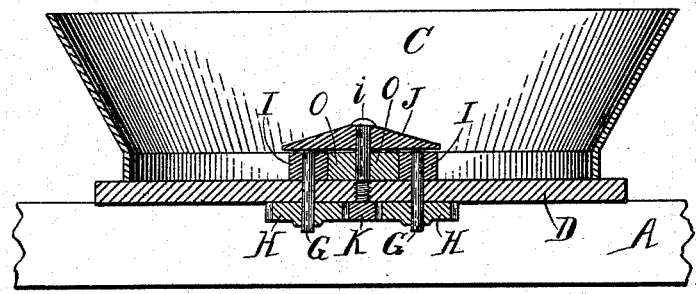
Figures 4, 5:
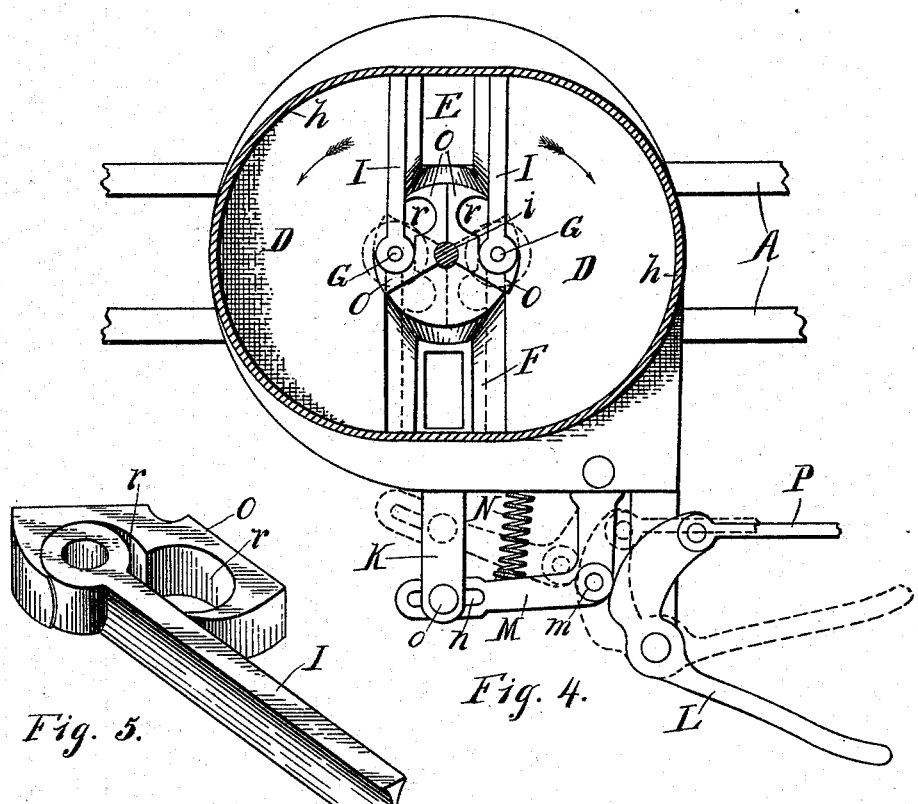

Figure 1 is a perspective view of a button cutting machine, showing my separating device in connection therewith. Fig. 2 is an enlarged section on dotted line 2—2 of Fig. 1. Fig. 3 is a sectional view as taken on dotted line 3—3 of Fig. 2. Fig. 4 is a horizontal section as taken on dotted line 4—4 of Fig. 2. Fig. 5 is a perspective view of one of the swinging arms, and its accompanying gate.

Referring to the letters of reference, A designates a suitable frame, in the uprights $b$, of which is a fixed shaft $d$, having the spurred end $a$, against which the shell is held while being cut. Supported in the uprights $f$ of the frame, is an adjustable rod $e$, and journaled on said rod is a hollow spindle B. Said spindle having a pulley thereon and being adapted to reciprocate longitudinally, and carrying at its free end an annular saw $c$, with which the buttons are cut. Connected with said spindle is a lever $g$, by means of which it may be reciprocated.

C designates a bowl or hopper with flaring sides, which is located directly under the cutter and is provided with a vertical base portion $h$ that rests upon the bed-plate or table D. Formed through said table in opposite edges thereof, are the openings E, and F, respectively, as clearly shown in Fig. 4. Through these openings the scraps and buttons that fall upon the table D, are discharged as hereinafter set forth. Passing through said table near its center, and journaled therein, are the shafts G, having fixed on their lower ends the opposed gear wheels H, more clearly shown in Fig. 3.

Fixed to the upper ends of the shafts H are the horizontally extending arms I, that are adapted, by the semi-rotation of said shafts, to sweep in oscillative succession over the surface of said table in the arc of a circle, the ends of said arms passing in proximity to the vertical base $h$ which is formed concentric with their point of pivot. Mounted over said arms and the openings E, F, in said table, is a cap J, having inclined sides, which causes the scraps and buttons falling thereon to slide to the table and prevents them from dropping through said openings until properly separated, said caps being supported on a central pin $i$ which screws into the table D.

K designates a rack bar having teeth on opposite edges thereof. Said rack passes between and engages the gear wheels H, and by its reciprocation rotates said wheels and causes the arms I to swing simultaneously back and forth in the arc of a circle across that portion of the table embraced within the radius of said arms. This reciprocation of said rack bar is effected by means of a cam-lever L which engages an anti-friction wheel $m$ located at the point of angle on the elbow M, which is pivoted at one end to the under face of the table D, and is provided at the other end with a slot $n$, that freely receives a pin $o$ passing through the outer end of said bar, whereby, by depressing the lever L, the elbow M is actuated to cause an inward thrust of the rack bar K, as shown by stipple lines in Fig. 4, thereby rotating the gears H and swinging the arms I over the face of the table in the direction indicated by the arrows in said figure, causing said arms to make one-half of a revolution. When the lever L is returned, the spring N also returns the elbow M, and with-draws the rack K, whereby the arms I are swung quickly back to their former position.

O designates two angular gates which are pivoted at their point of angle between the inner ends of the arms I upon the center pin *i*. These gates are provided with two contiguous recesses *r*, clearly shown in Fig. 5, that are adapted to successively embrace the rounded hub of said arms during their operation, and to so dispose themselves by the actuation of said arms, as to prevent any of the buttons or scraps from rolling past the pivoted ends of the arms into the center of the table, when said arms are in either of their fixed positions, as shown in Fig. 4, in which the full lines show the gates closing the space between the hub of said arms and the beveled edge of the opening F and the stipple lines show the arms in their reverse position and the gates closing the space between their pivoted ends and the opening E.

The connection of this separating device with the cutting mechanism is effected through the rod P which connects the cam lever L with the lever *g*, by which arrangement, as the lever L is depressed, the spindle B is moved longitudinally carrying the cutter *c* against the shell, during which operation of cutting, the rack K is actuated to cause the arms I to sweep the surface of the table and discharge the button previously cut into the opening F, at which time the cutting is completed, and the scraps fall onto the table, so that when the lever L is returned, the spring N acting quickly upon the rack K, causes the arms I to swing in the opposite direction and carry the scraps into the opening E. The button, which at this time is discharged from the cutter *c* by the rod *e*, as the spindle B recedes through the action of the lever L, falls onto the table and is swept into the opening F by the arms I during the succeeding operation of cutting, and so on the separation of the scraps and buttons continues simultaneously with the operation of cutting.

Having thus fully set forth my invention, what I claim as new, and desire to secure by Letters Patent, is—

1. In a button separating device, the combination of the receptacle having a bottom provided with oppposed openings therethrough, the oppositely pivoted arms located therein to oscillate in the arc of a circle between said openings, and means for actuating said arms simultaneously in opposite directions.

2. The combination of the hopper, the table having two diametrically opposite openings therethrough, the arm pivotally mounted between said openings, the gear-wheel on the journal of said arm, the longitudinally movable rack engaging said gear, and the lever for actuating said rack.

3. The combination of the horizontal table having inclined sides and provided with openings therethrough, the opposed arms pivotally mounted on shafts journaled in said table, said arms being adapted to oscillate in a semi-circle over the face of said table in the direction of the openings therein, the gear wheels on the shafts of said arms, the longitudinally movable rack engaging with said gears, and means for actuating said rack, whereby said arms are simultaneously swung in reciprocal succession in opposite directions.

4. The combination of the hopper and table, said table having openings therethrough, the arms pivotally mounted on said table, the gates pivotally mounted and embracing the pivoted ends of said arms to close the space between said ends and the openings through said table, substantially as specified.

5. The combination of the hopper, the table having openings therein, the arms pivotally mounted to oscillate over the surface of said table between said openings, and the cap having an inclined top, said cap being located over said openings through the table and the pivoted ends of said arms.

6. The combination of the horizontal table having discharge openings therethrough, the shafts passing through said table, the arms mounted thereon to oscillate in the arc of a circle over the face of said table, the gears on said shafts, the longitudinally movable rack engaging therewith, the pivoted elbow engaging said rack, the spring for returning said elbow, and the cam-lever engaging said elbow and having connection with the cutting mechanism, substantially as and for the purpose specified.

In testimony whereof I affix my signature in presence of two witnesses.

JOSEPH W. HOLMAN.

Witnesses:
E. S. WHEELER,
E. K. ROEMER.